No. 645,019. Patented Mar. 6, 1900.
A. T. SCOTT.
GOVERNOR MECHANISM FOR WINDMILLS.
(Application filed May 20, 1899.)
(No Model.) 3 Sheets—Sheet 1.
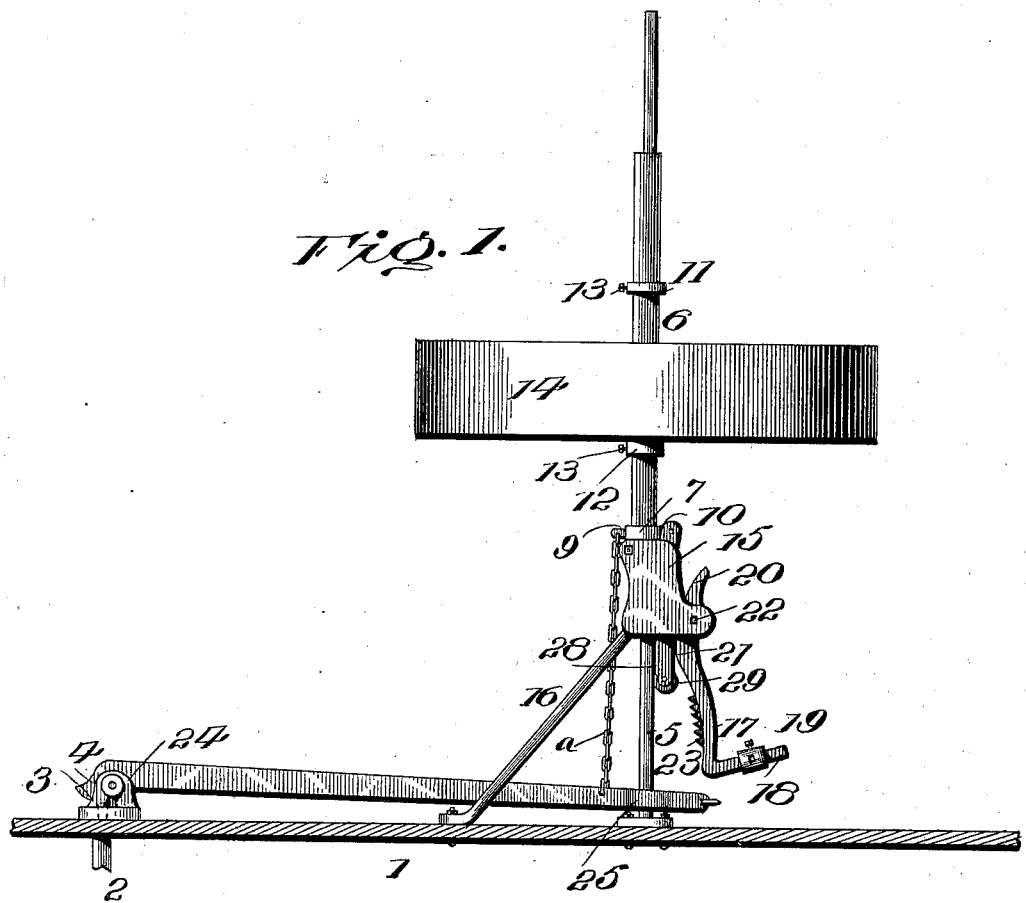
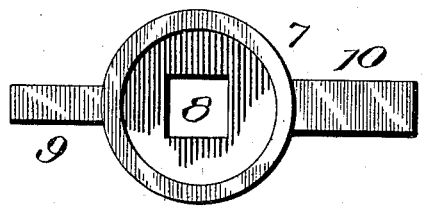
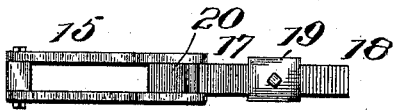
Inventor
Albert T. Scott No. 645,019. Patented Mar. 6, 1900.
A. T. SCOTT.
GOVERNOR MECHANISM FOR WINDMILLS.
(Application filed May 20, 1899.)
(No Model.) 3 Sheets—Sheet 2.
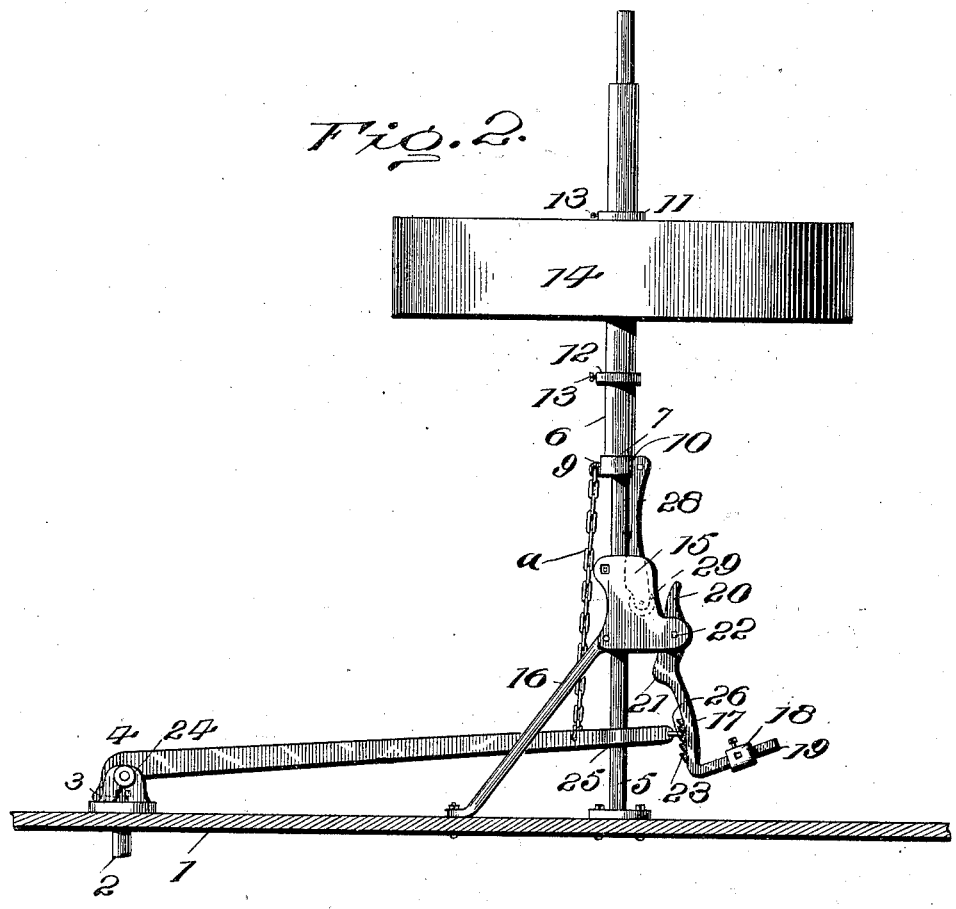
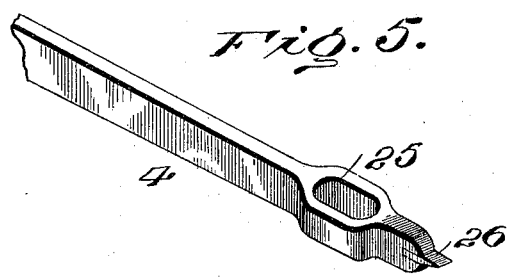
Witnesses
Inventor
Albert T. Scott
by R. S. & A. B. Lacey, his Attorneys No. 645,019. Patented Mar. 6, 1900.
A. T. SCOTT.
GOVERNOR MECHANISM FOR WINDMILLS.
(Application filed May 20, 1899.)
(No Model.)
3 Sheets—Sheet 3.
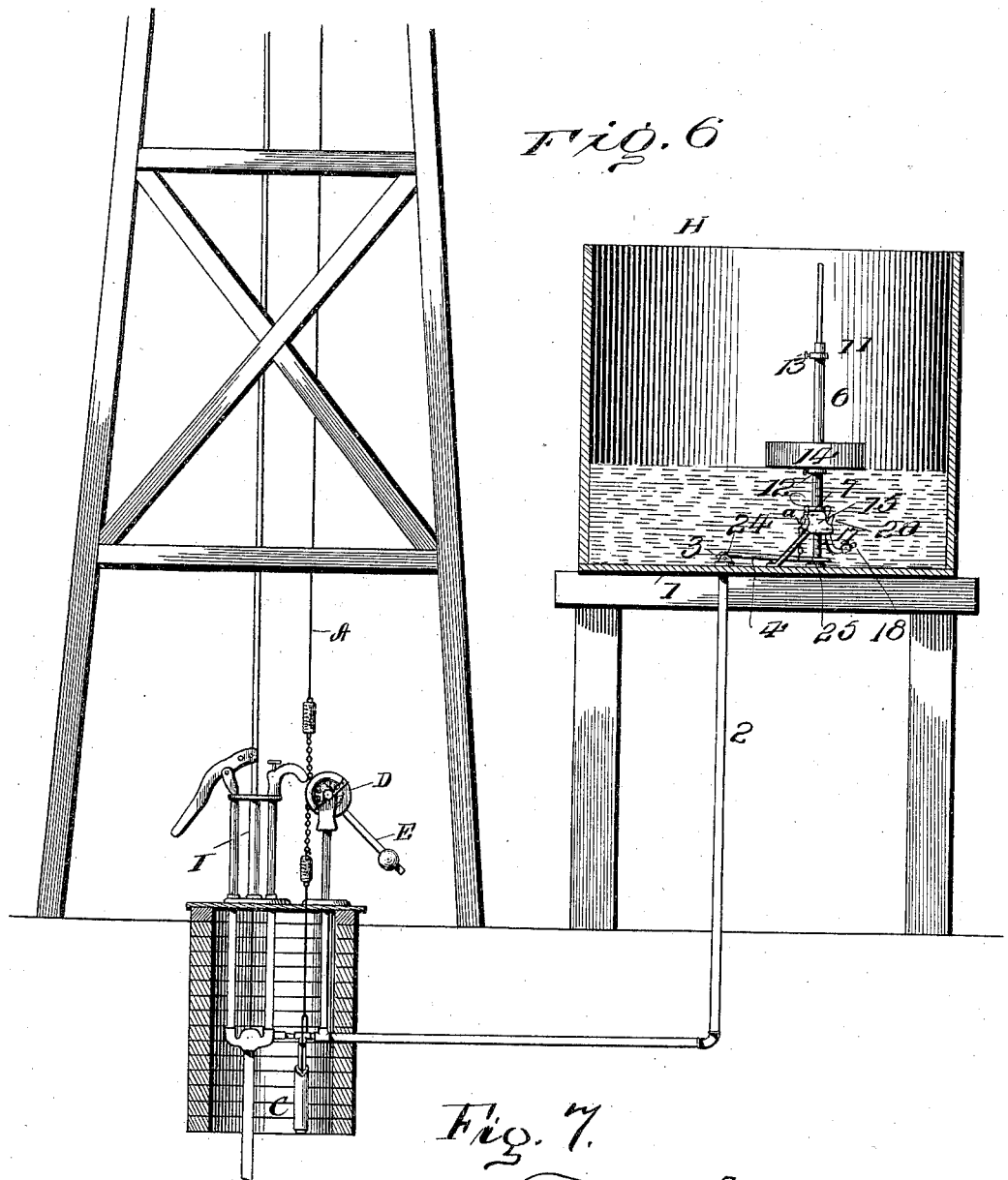
Witnesses
Jno Missie
Gladys D. Thompson
Inventor
Albert T. Scott.
by R. A. B. Lacey, his Attorneys.

UNITED STATES PATENT OFFICE.

ALBERT T. SCOTT, OF DEFIANCE, IOWA, ASSIGNOR OF ONE-HALF TO JOHN W. RILEY, OF SAME PLACE.

GOVERNOR MECHANISM FOR WINDMILLS.

SPECIFICATION forming part of Letters Patent No. 645,019, dated March 6, 1900.

Application filed May 20, 1899. Serial No. 717,631. (No model.)

*To all whom it may concern:*

Be it known that I, ALBERT T. SCOTT, a citizen of the United States, residing at Defiance, in the county of Shelby and State of Iowa, have invented certain new and useful Improvements in Governor Mechanisms for Windmills; and I do hereby declare the following to be a full, clear, and exact description of the invention, such as will enable others skilled in the art to which it appertains to make and use the same.

This invention relates to governor mechanisms for wind-engines to throw them into and out of action according as the level of the water in the tank falls below or reaches a predetermined point.

The purpose of the invention is to instantly open and close the valve controlling the admission of the water from the pump to the tank, in contradistinction to gradually opening and closing the said valve, as generally practiced, and which is open to serious objection because of the extra load and additional wear imposed upon the engine by the frequency of opening and closing the valve due to the withdrawal of small quantities of water from the tank.

By this invention the level of the water is permitted to recede from a given plane to some considerable extent before the governor is actuated to throw the mill into action. Hence small quantities of water may be drawn from the tank at different periods without affecting the governor to the extent of throwing the engine into action until the sum of the several quantities drawn off causes the level of the water to fall to the point when the governor will act to throw the engine into gear to replenish the tank.

Another feature of the improvement is to operate the valve quickly by a snap-like action, thereby shutting off the supply and again turning it on instantly, so as to obviate the objections urged against the slow or gradually-operated valve.

For a full understanding of the merits, advantages, and details of construction of the invention reference is to be had to the following description and the drawings hereto attached.

Within the purview of the invention it is to be understood that various changes in the form, proportion, and minor details of construction may be resorted to without departing from the spirit or sacrificing any of the advantages thereof.

In the drawings, Figure 1 is an elevation of the governor mechanism, showing the relation of the parts when the valve is open. Fig. 2 is a view similar to Fig. 1, showing the disposition of the parts when the valve is closed. Fig. 3 is a top plan view of the cap applied to the lower end of the slidable tube. Fig. 4 is a top plan view of the guide or head applied to the tank-rod. Fig. 5 is a detail view of the outer end portion of the lever provided with the valve. Fig. 6 is a detail view of the lower portion of a windmill-tower and the upper portion of a well, showing the pump, the regulator for throwing the engine into and out of gear, and the governor. Fig. 7 is a detail view of the tank-valve for controlling the inflow of the water and the pivotal end of the lever cooperating therewith.

Corresponding and like parts are referred to in the following description and indicated in all the views of the drawings by the same reference characters.

The governor mechanism is adapted to be placed within the tank H and is preferably secured to the bottom thereof, the latter being indicated at 1, the supply-pipe at 2, the valve for controlling the supply at 3, and the lever carrying the valve at 4. A rod or bar 5, of angular outline in cross-section, is firmly attached at its lower end to the bottom 1 of the tank and rises vertically therefrom. A tube 6 is slidably mounted upon the rod 5 and is provided at its lower end with a cap 7, having an angular opening 8 to receive the rod 5 and prevent relative turning of the tube 6 thereon without interfering with the free vertical movements of the said tube. This cap is provided at opposite points with offstanding portions 9 and 10 for a purpose presently to be described. Stops 11 and 12 are located upon the tube 6 and are spaced apart and are relatively adjustable, being held in place by means of clamp-screws 13, let into threaded openings of the said stops. A float 14, of any of the usual types, is mounted upon the tube 6 between the stops 11 and 12 in such a manner as to have free movement, limited in extent by the said stops and the movement of the tube 6, as will appear more fully hereinafter.

A head 15 is secured to the lower portion of the rod 5 and consists of parallel plates clamped against opposite sides of the said rod, braces 16 being interposed between said head and the bottom of the tank to steady it and the rod 5. A weighted lever 17 is pivoted between projecting portions of the plates or head 15, and its lower end is bent outwardly, as shown at 18, and receives a weight 19, which is adjustably connected therewith. A curved extension 20 is provided at the upper end of the lever, and a rounded protuberance 21 is located at the inner edge of the lever, a short distance from its pivotal support 22. A series of ratchet-teeth 23 are provided upon the inner edge of the lower portion of the lever to coöperate with the free end of the lever 4, so as to hold the valve 3 seated until the level of the water in the tank falls below a given point.

The lever 4 is of elbow form and is fulcrumed to a bracket 24, applied to the bottom of the tank. The outer end portion of the lever is spread or formed into an eye 25, through which the rod 5 passes, while the inner end portion thereof is formed with an arm or extension, as shown in detail in Fig. 7, having a curved or cam face adapted to ride upon and operate the valve 3 in a manner readily understood. A hardened point 26 is applied to the outer extremity of the lever 4 to coöperate with the teeth 23. A chain $a$ or analogous connection is interposed between the outer end portion of the lever 4 and the offstanding portion 9 of the cap 7 and is the means of connection between the tube 6 and lever 4. An arm 28 is pivotally connected at its upper end with the offstanding portion 10, and its lower end is provided with a roller 29 and operates in the space formed between projecting portions of the plates comprising the head 15.

When the tank is empty or the level of the water has fallen to a given point, the parts will assume a position substantially as shown in Fig. 1, the valve 3 being open, the outer end of the lever 4 depressed, the float resting upon the lower stop 12, and the tube 6 in contact with the head 15. The wind-engine will be thrown into gear when the governor assumes the position about as shown in Fig. 1 and by the dotted lines in Fig. 6, and water will be supplied to the tank through the pipe 2 in the ordinary manner. As the water rises in the tank the float will be buoyed upward and brought into contact with the upper stop 11 and effect a vertical movement of the tube 6 and the pivoted arm 28. As the roller 29 passes the protuberance 21 of the weighted lever 17 the latter will be thrown outward at its lower end and permit the free end of the lever 4 to move upward by the pull of the float upon the connection 27 through the tube 6 and upper stop. The upward movement of the free end of the lever 4 closes the valve 3 and shuts off the supply of water, the lever being held elevated at its free end by engagement with the teeth 23 of the lever 17. As the water is withdrawn from the tank the float lowers and settles upon the stop 12 and causes a descent of the tube 6 and the pivoted arm 28. As the roller 29 of the pivoted arm comes in contact with the protuberant portion 21 of the lever 17 the latter is moved outward at its lower end and liberates the lever 4, which gravitating at its free end permits the valve 3 to open, when the water will again be supplied to the tank in the manner set forth.

When the tank needs replenishing, the wind-engine is thrown into gear in the usual manner, and after the tank has received an ample supply the wind-engine is thrown out of gear in the ordinary way. It will be seen that the float 14 has a movement independent of the tube 6, depending upon the distance between the stops 11 and 12, and by moving said stops the highest and lowest levels of water in the tank can be controlled.

The tank H, containing the governor mechanism, may be conveniently located, the pump I of any type, and the regulator C of any variety controlled by the variable pressure of the water to effect the gearing and the ungearing of the engine through the wire, cable, or like connection A in the well-known manner. The regulator-head D consists of two pulleys and is interposed in the length of the connection A, the end portions of said connection being reversely wound upon the pulleys and said head being balanced by the weighted arm E.

Having thus described the invention, what is claimed as new is—

1. In a governor mechanism of the type described, the combination with the lever for controlling the movements of the regulating-valve, of a float controlled in its movements by the change of level of the water in the tank, a support for the float provided with upper and lower stops between which the said float has a limited movement and a flexible connection between the said support and lever, as and for the purpose set forth.

2. In governor mechanism of the character specified, the combination with the lever for controlling the movements of the regulating-valve, of a float controlled in its movements by the change of level of the water in the tank, a vertical guide, a support for the float slidably mounted upon the guide, upper and lower stops adjustably connected with the said support and limiting the movements of the float with reference to its support, and a flexible connection between the said support and lever, as and for the purpose set forth.

3. In a governor mechanism of the character described, the combination with the lever for controlling the movements of the regulating-valve, and a weighted lever adapted to interlock with and hold the valve-controlling lever in an operative position, of a float, a support for the float operatively connected with the valve-controlling lever and provided with upper and lower stops between which the float has limited play, and an arm applied to and movable with the said support and adapted to release the weighted lever from the valve-controlling lever, as and for the purpose set forth.

4. In governor mechanism of the type specified, a valve-controlling lever, an interlocking lever, a float, a support for the float, upper and lower stops having adjustable connection with the support for limiting the relative movements of the float, a positive connection between said support and the valve-controlling lever, and an arm carried by the said support and adapted to release the said interlocking lever, substantially in the manner set forth and for the purpose described.

5. In governor mechanism of the class set forth, a valve-controlling lever, an interlocking lever, a vertically-disposed rod, a tube slidable upon said rod and prevented from turning thereon, a float movable upon the tube, stops applied to the tube and limiting the movements of the float with reference thereto, a connection between the valve-controlling lever and tube, and an arm carried by the tube and adapted to release the interlocking lever, as and for the purpose set forth.

6. In governor mechanism of the class specified, a valve-controlling lever, an interlocking lever, a vertically-disposed rod, a tube slidable upon the rod and provided with spaced stops, a cap applied to the tube and coöperating with the rod to prevent relative turning of the tube thereon, a float mounted upon the tube and having free play between the stops thereof, a connection between said cap and valve-controlling lever, and an arm applied to the said cap and adapted to effect a release of the interlocking lever, substantially as specified.

7. In valve mechanism of the class set forth, the valve-controlling lever, a vertically-disposed rod, a head secured to said rod, a tube slidable upon said rod and connected with the valve-controlling lever and provided with spaced stops, a float mounted upon said tube and movable between the stops thereof, an interlocking lever pivoted to the aforesaid head, and an arm applied to the said tube and adapted to operate through the head and effect the release of the interlocking lever, substantially as set forth.

8. In governor mechanism of the character described, the combination with the valve-controlling lever, a vertically-disposed rod, and a tube slidable upon said rod and connected with the valve-controlling lever and provided with spaced stops, of a head secured to the said rod, an interlocking lever pivoted to said head, an arm applied to the said tube and movable therewith and adapted to release the interlocking lever, and a float mounted upon the tube between the stops thereof, as and for the purpose set forth.

9. In governor mechanism of the character described, the combination with the valve-controlling lever, the vertically-disposed rod, a tube slidable upon the rod and provided with spaced stops and operatively connected with the valve-controlling lever, and a float mounted upon the tube between the stops thereof, of a head secured to the aforesaid rod, an interlocking lever pivoted to the said head and provided with an upper extension and an inner lower protuberant portion, and an arm carried by the said tube and adapted to effect a release of the said interlocking lever, substantially as described.

10. A governor mechanism constructed substantially as set forth and comprising a valve-controlling lever, a vertically-disposed rod, a tube slidable upon said rod, a cap applied to said tube and constructed to prevent relative turning thereof upon the rod, a connection between said cap and the valve-controlling lever, upper and lower stops adjustably connected with the tube, a float mounted upon the tube between the adjustable stops, a head secured to the rod, a lever pivoted to the said head, and having an upper extension, an inner lower protuberant portion, a toothed part and an extension upon which a weight is adjustably mounted, and an arm pivotally connected with the aforesaid cap and provided at its lower end with a roller disposed to coöperate with the protuberant portion of the weighted lever, substantially as and for the purpose set forth.

In testimony whereof I affix my signature in presence of two witnesses.

ALBERT T. SCOTT. [L. S.]

Witnesses:
WESLEY J. WILLIAMS,
ORVILLE F. COX.